United States Patent [19]

Satomi et al.

[11] 3,917,753
[45] Nov. 4, 1975

[54] PHOSPHOROTHIONOAMIDATES

[75] Inventors: Takeo Satomi, Nishinomiya; Naganori Hino, Toyonaka; Ryo Yoshida, Minoo; Kunio Mukai, Nishinomiya, all of Japan

[73] Assignee: Sumitomo Chemical Company, Limited, Osaka, Japan

[22] Filed: Dec. 13, 1973

[21] Appl. No.: 424,311

[30] Foreign Application Priority Data
Dec. 15, 1975  Japan.............................. 47-126630
Dec. 15, 1975  Japan.............................. 47-126631

[52] U.S. Cl..................................... 260/954; 71/87
[51] Int. Cl.² ............................................ C07F 9/24
[58] Field of Search............................ 260/954, 973

[56] References Cited
UNITED STATES PATENTS

| | | | |
|---|---|---|---|
| 3,472,920 | 10/1969 | Schrader et al..................... | 260/954 |
| 3,636,143 | 1/1972 | Schrader et al..................... | 260/954 |
| 3,711,582 | 1/1973 | Schrader et al..................... | 260/954 |
| 3,760,044 | 9/1973 | Schrader et al..................... | 260/954 |
| 3,787,538 | 1/1974 | Schrader et al..................... | 260/954 |

Primary Examiner—Richard L. Raymond
Attorney, Agent, or Firm—Wenderoth, Lind & Ponack

[57] ABSTRACT

The present invention relates to a phosphorothionoamidate plant growth regulator of the formula:

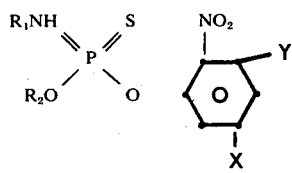

wherein $R_1$ is a straight or branched propyl or butyl, $R_2$ is a lower alkyl having up to 4 carbon atoms, X is a hydrogen atom, alkyl having 2 to 5 carbon atoms, a halogen atom or trifluoromethyl and Y represents a hydrogen atom, alkyl having 1 to 5 carbon atoms, a halogen atom or trifluoromethyl, and one of X and Y always represents a hydrogen atom. The present invention also relates to a method of preparing the phosphorothionoamidate by reacting a thionophosphoric acid ester amide chloride with a nitrophenol compound.

3 Claims, No Drawings

PHOSPHOROTHIONOAMIDATES

This invention relates to a novel phosphorothionoamidate compound, a novel plant growth regulating agent characterized by containing said compound as an active component and to a process for producing the same.

More particularly, the present invention relates to a phosphorothionoamidate derivative with an excellent plant growth regulating activity represented by the general formula (I):

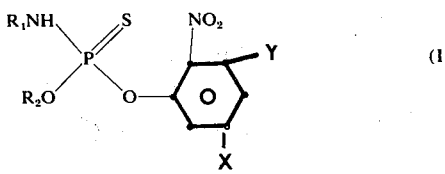

wherein $R_1$ represents a straight or branched propyl or butyl, $R_2$ represents a lower alkyl having up to 4 carbon atoms, X represents a hydrogen atom, alkyl having 2 to 5 carbon atoms, halogen atom or trifluoromethyl and Y represents a hydrogen atom, alkyl having 1 to 5 carbon atoms, halogen atom or trifluoromethyl, and one of X and Y always represents a hydrogen atom.

The compound of the general formula (I) may be produced by condensing a thionophosphoric acid ester amide chloride represented by the general formula (II):

wherein $R_1$ and $R_2$ are as defined above, with a nitrophenol represented by the general formula (III):

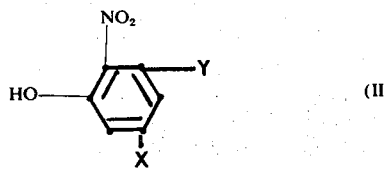

wherein X and Y are as defined above.

We have found that the compound (I) of the present invention acts on such part of the plant in which the mitosis is severe such as the growing part of the plant, so that the mitosis is prevented. When such part, upon application of the compound (I), is observed with a microscope, it is recognized that the mitosis is stopped and the cells are swollen. The other parts of the plant than the growing part are not adversely affected by the said compound and neither such unbalance of water as is seen in the withering of leaves nor such reduction of chlorophyl as in the fading of leaves is observed. Therefore, the photosynthesis of a plant is normally carried on without being affected by the compound (I) in the other parts than the growing part.

Based on this interesting finding we have made experiments to use the compound (I) of this invention as a plant growth regulating agent.

Today plant growth regulating agents are utilized to regulate the budding and rooting of plants, to accelerate or inhibit their growth, to regulate their florescence and fruiting, to regulate their fruitage and maturity, to improve their quality, to maintain their freshness and to increase their storability.

It has been found that the compound (I) of the present invention can be utilized mostly to inhibit the growth of plants due to the above explained characteristics. To enumerate some examples, in cultivating sweet potatoes, they are sometimes cultivated with much fertilizer to harvest a large crop. However when the weather is abnormal, the growth of the tuberous roots will be prevented. In such case, if the compound (I) of the present invention is applied, the growth of the runners will be stopped, the product by the photosynthesis will not be used to expand the leaves but will be used to grow the tuberous roots, and as a result the production will increase.

In the cultivation of apples, with the growth of the trees, the trees will become so high that much labor will be required for such work as the harvesting. However, if the compound of the present invention is applied, the extension of new trunks will be inhibited, while the production of flowers and sprouts will not be influenced and therefore the harvesting work will become easy.

In the cultivation of waterfield rice plants, the falling of the rice plants caused by the cultivation with much fertilizer and the attack by strong wind like typhoons is a troublesome problem. If they fall, the harvesting work will become difficult. In such case, when the compound of the present invention is applied 30 to 40 days before the bearing of the rice plants, a distinct difference from a non-treated section is seen in the treated section. Thus, in the treated section, the rice plants are controlled to be, for example, of 80 to 90% of the height and do not fall.

In the art of cultivation of chrysanthemums, it is known that the flowers are mostly gorgeous and beautiful in the species having large flowers and long stems. In cultivating them, their stems become so high that, if they are to be cultivated without a herbicide, they will be disadvantageous in elevating the commodity value. However, when the compound of the present invention is applied, the stems are controlled to be, for example, 50 to 80% of the height, without affecting the diameters of the flowers and the time of the florescence. Thus, it becomes possible to reduce the labor without lowering the commodity value.

In addition to the above examples, it is possible to utilize the compound of the present invention for the improvement of the storability of harvested crops. For example, onions will bud 2 to 3 months after they are harvested. Such budding is controlled usually by preserving them by refrigeration. However, when the compound of the present invention is applied just before they are harvested, the budding will be inhibited. Further, the compound of the present invention can be utilized in storing potatoes and preventing the budding of wheat. The amount of use of the compound of the present invention is generally small and its oral toxicity is low so that there is no troublesome problem of the environment pollution.

In synthesizing the compound (I) of the present invention, a thionophosphoric acid ester amide chloride represented by the above general formula (II) and a nitrophenol represented by the above indicated general formula (III) are condensed by using a proper dehydrochlorination agent in a inert solvent. As solvents to be used, aromatic solvents such as benzene and toluene, ketonic solvents such as acetone and methylethyl ketone and acetonitrile are preferable.

As dehydrochlorination agents, inorganic bases such as potassium carbonate and sodium carbonate and organic bases such as pyridine and triethylamine are preferable. The reaction temperature and reaction time vary depending upon the particular solvent or dehydrochlorination agent but are generally it is preferable that the condensation is carried out at a temperature of the room temperature to about 120°C. for about 1 hour to several hours.

The compounds (I) synthesized by the above process are illustrated as follows but the present invention is not limited to these specific compounds:

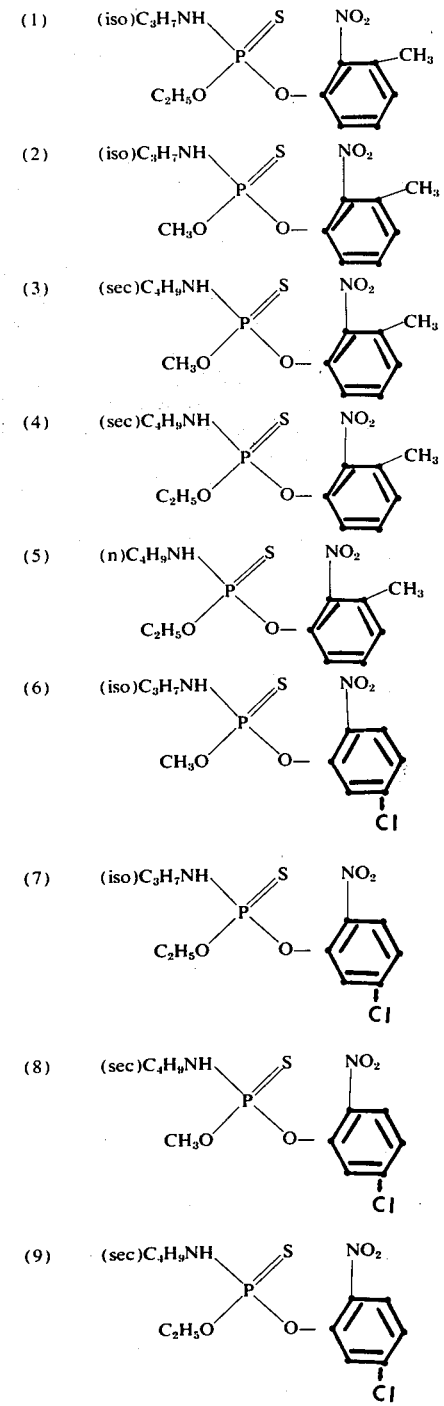

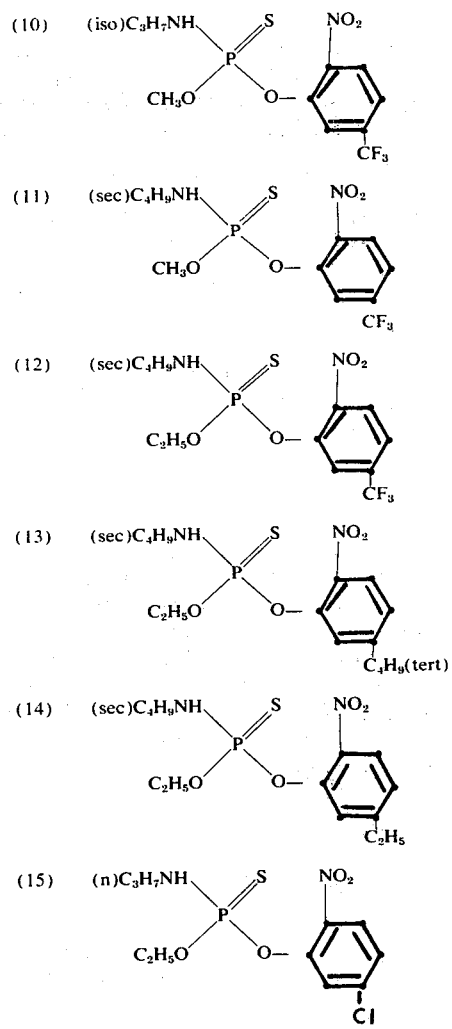

In the actual use of the compound of the present invention, it may be applied not only in its original form itself but also in a properly formulated form such as emulsifiable concentrates, wettable powders, dusts, oil sprays, granules, fine granules and coatings. In preparing such processed products, there can be used such solid carriers as talc, nentonite, clay, kaolin, diatomaceous earth, vermiculite and slaked lime and such liquid carrier as benzene, alcohols, acetone, xylene, methylnaphthalene, dioxane and cyclohexanone.

Further, in the actual use, a surface active agent such as a sticker or extender conventionally used in the art of agricultural chemical agents may be used to improve the efficacy. It is also possible to use other agents such as a sterilizer, insecticide, herbicide, fertilizer, etc., together with the agent of this invention.

The followings are examples of preparing plant growth regulating agents of the present invention. The names of the active compounds are represented by the respective numbers indicated herein before.

PREPARATION EXAMPLE 1

25 parts by weight of the compound (2), 5 parts by weight of a polyoxyethylene acetylaryl ester surface active agent and 70 parts by weight of talc are well crushed and mixed to obtain a wettable powder.

PREPARATION EXAMPLE 2

30 parts by weight of the compound (1), 20 parts by weight of a polyethylene glycol ether surface active agent and 50 parts by weight of cyclohexanone are well mixed to obtain an emulsifiable concentrate.

PREPARATION EXAMPLE 3

8 parts by weight of the compound (3), 38 parts by weight of bentonite, 50 parts by weight of clay and 4 parts by weight of sodium ligninsulfonate are well crushed and mixed. The mixture is kneaded with the addition of water and then granulated and dried to obtain granules.

The present invention will be explained more particularly by means of the following test examples. The names of the compounds in these test examples are represented by the respective numbers indicated herein before.

TEST EXAMPLE 1

Rice plant falling test

Seeds of rice plants were sown in a seed-bed on May 15 and were transplanted into a paddy field on June 20. The total amounts of the components of the applied fertilizer were 1.8 kg./a. of N, 1 kg./a. of P and 1 kg./a. of K. Each testing section was of 3 m. × 3 m.

In the treatment with the agent, the active compound was sprinkled in the form of an emulsion as diluted with 10 l./a. of water onto the stems and leaves of the rice plants on July 30. The rice plants were investigated on Oct. 20. By the way, the falling degrees are represented by 0 (no falling) to 100 (all plants fell).

| Compound number | Applied amount (g./a.) | Plant height (cm.) | Yield (kg./a.) | Falling degree |
| --- | --- | --- | --- | --- |
| (1) | 5 | 70 | 43 | 0 |
|  | 2.5 | 75 | 46 | 10 |
| (4) | 5 | 73 | 43 | 10 |
|  | 2.5 | 82 | 44 | 10 |
| (6) | 5 | 75 | 45 | 10 |
|  | 2.5 | 85 | 45 | 10 |
| (10) | 5 | 71 | 42 | 0 |
|  | 2.5 | 77 | 45 | 10 |
| Untreated |  | 95 | 45 | 90 |
| Control |  |  |  |  |
| (2,4—D)Cl— OCH₂COON₂ | 5 | 90 | 40 | 80 |

TEST EXAMPLE 2

Controlled cultivation of the chrysanthenums

Large diameter chrysanthemum stems were cut and planted on June 25 and were fixed in a field on July 25. One month later, the sprouts were plucked and then, on Sept. 4 corresponding to the 10th day after the sprouts were plucked, the compound of the present invention was sprinkled in the form of an emulsion as diluted with 10 l./a. of water onto the stems and leaves. For the test, 50 chrysanthemum stems were fixed per square meters. As a fertilizer, a total of 2.5 kg./a. of each of the components N, P and K was applied in 3 times. Each treating section was 1 m².

| Compound number | Applied amount (g./a.) | Stem height (cm.) | Flower diameter (cm.) | Florescent time |
| --- | --- | --- | --- | --- |
| (4) | 3 | 75 | 25 | October 18 |
| (5) | 3 | 68 | 25 | October 17 |
| (8) | 3 | 78 | 27 | October 18 |
| (14) | 3 | 43 | 26 | October 20 |
| Untreated |  | 153 | 27 | October 15 |

TEST EXAMPLE 3

Improvement of the storability of onions

The compound of the present invention was sprinkled in the form of an emulsion as diluted with 10 l./a. of water onto ordinarily cultivated onions 5 days before they were harvested. Then they were harvested and were left in a refrigerating chamber at 5°C.

| Compound number | Applied amount (g./a.) | Treated number | Sprouting (%) after 6 months |
| --- | --- | --- | --- |
| (4) | 5 | 30 | 0 |
|  | 2.5 | 30 | 17 |
| (14) | 5 | 30 | 7 |
|  | 2.5 | 30 | 10 |
| Untreated |  | 30 | 93 |

The followings are Examples of syntheses of the compounds of this invention.

EXAMPLE 1

15.5 g. of 3-methyl-2-nitrophenol were dissolved in 100 ml. of acetonitrile. Then 15.2 g. of anhydrous potassium carbonate powder were added to the solution and then 21.6 g. of O-ethyl-N-(sec)butylamide chloride thionophosphate were dropwise added thereto at 60° to 65°C. during 1 hour. Then the solution was agitated at 70°C. for 4 hours. After the solvent was distilled away under a reduced pressure, benzene was added to the residue and the mixture was washed with 5% sodium carbonate and then with water. The benzene was removed under a reduced pressure to substantially quantitatively obtain a crude ester as a residue. The residue was column-chromatographed with silica gel, and there were obtained 25.7 g. of yellow oily O-ethyl-O-(3-methyl-2-nitrophenyl)-N-(sec)butylphosphoroamide-thioate of a refractive index $n_D^{24.0}$ of 1.5355.

| Elemental analysis: Calculated (%) (as $C_{13}H_{21}N_2O_4PS$) | Found (%) |
|---|---|
| C    46.98 | 46.75 |
| H     6.37 | 6.44 |
| N     8.43 | 8.56 |
| P     9.32 | 9.71 |

EXAMPLE 2

15.5 g. of 3-methyl-2-nitrophenol, 100 ml. of acetonitrile, 15.2 g. of anhydrous potassium carbonate powder and 20.1 g. of O-methyl-N-(sec)butylamide chloride thionophosphate were made to react in the same manner as in Example 1 to obtain 23.1 g. of yellow oily O-methyl-O-(3-methyl-2-nitrophenyl)-N-(sec)butylphosphoroamidethioate of a refractive index $n_D^{22.0}$ of 1.5465.

| Elemental analysis: Calculated (%) (as $C_{12}H_{19}N_2O_4PS$) | Found (%) |
|---|---|
| C    45.27 | 45.08 |
| H     6.03 | 6.21 |
| N     8.80 | 8.57 |
| P     9.73 | 9.65 |

EXAMPLE 3

15.5 g. of 3-methyl-2-nitrophenol, 100 ml. of acetonitrile, 15.2 g. of anhydrous potassium carbonate powder and 20.1 g. of O-ethyl-N-(iso)propylamide chloride thionophosphate were made to react in the same manner as in Example 1 to obtain 21.2 g. of yellow oily O-ethyl-O-(3-methyl-2-nitrophenyl)-N-(iso)propylphosphoroamidethioate of a refractive index $n_D^{25.0}$ of 1.5281.

| Elemental analysis: Calculated (%) (as $C_{12}H_{19}N_2O_4PS$) | Found (%) |
|---|---|
| C    45.27 | 45.51 |
| H     6.03 | 5.82 |
| N     8.80 | 8.79 |
| P     9.73 | 9.70 |

EXAMPLE 4

Compound No. (9)

17.5 g. of 3-chlor-6-nitrophenol were dissolved in 100 ml. of acetonitrile. Then 15.2 g. of anhydrous potassium carbonate powder were added to the solution and then 21.6 g. of O-ethyl-N-(sec)butylamide chloride thiophosphate were dropwise added thereto at 60° to 65°C. during 1 hour. Then the solution was agitated at 70°C. for 4 hours. After the solvent was distilled away under a reduced pressure, benzene was added to the residue and the mixture was washed with 5% sodium carbonate and then with water. The benzene was removed under a reduced pressure to substantially quantitatively obtain a crude ester as a residue. The residue was column-chromatographed with silica gel, to obtain 25.0 g. of yellow oily O-ethyl-O-(3-chlor-6-nitrophenyl)-N-(sec)butylphosphoroamidethioate of a refractive index $n_D^{21.0}$ of 1.5479.

| Elemental analysis: Calculated (%) (as $C_{12}H_{18}ClN_2O_4PS$) | Found (%) |
|---|---|
| C    40.86 | 40.57 |
| H     5.14 | 5.06 |
| N     7.94 | 7.69 |
| P     8.78 | 8.93 |

In the following examples, the respective compounds were synthesized in the same manner as above.

EXAMPLE 5

Compound No. (6)

Milkwhite crystals of O-methyl-O-(3-chlor-6-nitrophenyl)-N-(iso)propylphosphoroamidethioate of a melting point of 41° to 43°C.

| Elemental analysis: Calculated (%) (as $C_{10}H_{14}ClN_2O_4PS$) | Found (%) |
|---|---|
| C    36.98 | 37.03 |
| H     4.35 | 4.15 |
| N     8.63 | 8.67 |
| P     9.54 | 9.50 |

EXAMPLE 6

Compound No. (8)

Yellow oily O-methyl-O-(3-chlor-6-nitrophenyl)-N-(sec)butylphosphoroamidethioate of a refractive index $n_D^{22.0}$ of 1.5584.

| Elemental analysis: Calculated (%) (as $C_{11}H_{16}ClN_2O_4PS$) | Found (%) |
|---|---|
| C    39.00 | 38.76 |
| H     4.76 | 4.69 |
| N     8.27 | 8.38 |
| P     9.14 | 9.25 |

EXAMPLE 7

Compound No. (10)

Light yellow oily O-methyl-O-(3-trifluoromethyl-6-nitrophenyl)-N-(iso)propylphosphoroamidethioate of a refractive index $n_D^{22}$ of 1.4981.

| Elemental analysis: Calculated (%) (as $C_{11}H_{14}F_3N_2O_4PS$) | Found (%) |
|---|---|
| C    36.87 | 36.55 |
| H     3.95 | 4.07 |
| N     7.82 | 7.60 |
| P     8.64 | 8.34 |

EXAMPLE 8

Compound No. (11)

Yellow oily O-methyl-O-(3-trifluoromethyl-6-nitrophenyl)-N-(sec)butylphosphoroamidethioate of a refractive index $n_D^{25.0}$ of 1.5023.

| Elemental analysis: | | |
|---|---|---|
| | Calculated (%) (as $C_{12}H_{16}F_3N_2O_4PS$) | Found (%) |
| C | 38.71 | 38.91 |
| H | 4.33 | 4.45 |
| N | 7.52 | 7.36 |
| P | 8.32 | 8.44 |

EXAMPLE 9

Compound No. (12)

Yellow oily O-ethyl-O-(3-trifluoromethyl-6-nitrophenyl)-N-(sec)butylphosphoroamidethioate of a refractive index $n_D^{23.0}$ of 1.4928.

| Elemental analysis: | | |
|---|---|---|
| | Calculated (%) (as $C_{13}H_{18}F_3N_2O_4PS$) | Found (%) |
| C | 40.42 | 40.25 |
| H | 4.70 | 4.78 |
| N | 7.25 | 7.10 |
| P | 8.02 | 8.36 |

What we claim is:

1. A phosphorothionoamidate of the formula:

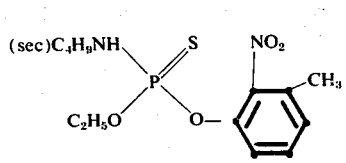

2. A phosphorothionoamidate of the formula:

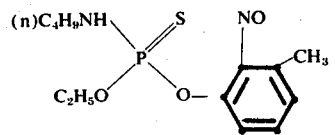

3. A phosphorothionoamidate of the formula:

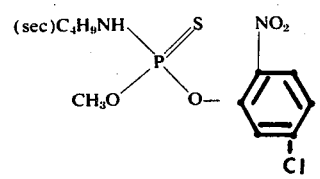

* * * * *